United States Patent
Kim et al.

(10) Patent No.: US 11,310,639 B2
(45) Date of Patent: Apr. 19, 2022

(54) METHOD AND DEVICE FOR V2X TERMINAL TO RECEIVE PSCCH SCHEDULING INFORMATION AND TRANSMIT PSCCH IN WIRELESS COMMUNICATION SYSTEM

(71) Applicant: LG ELECTRONICS INC., Seoul (KR)

(72) Inventors: Heejin Kim, Seoul (KR); Seungmin Lee, Seoul (KR); Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

(21) Appl. No.: 16/638,088

(22) PCT Filed: Aug. 13, 2018

(86) PCT No.: PCT/KR2018/009291
§ 371 (c)(1),
(2) Date: Feb. 10, 2020

(87) PCT Pub. No.: WO2019/031952
PCT Pub. Date: Feb. 14, 2019

(65) Prior Publication Data
US 2020/0221271 A1    Jul. 9, 2020

Related U.S. Application Data

(60) Provisional application No. 62/543,968, filed on Aug. 11, 2017, provisional application No. 62/544,098, filed on Aug. 11, 2017.

(51) Int. Cl.
*H04W 4/40* (2018.01)
*H04W 72/04* (2009.01)
*H04W 92/18* (2009.01)

(52) U.S. Cl.
CPC ........... *H04W 4/40* (2018.02); *H04W 72/042* (2013.01); *H04W 72/0446* (2013.01); *H04W 72/0493* (2013.01); *H04W 92/18* (2013.01)

(58) Field of Classification Search
None
See application file for complete search history.

(56) References Cited

U.S. PATENT DOCUMENTS

2018/0048994 A1\* 2/2018 Kwon ................... H04W 72/02
2019/0029006 A1\* 1/2019 Wang ................ H04W 72/1289
(Continued)

FOREIGN PATENT DOCUMENTS

EP          3128797          2/2017
WO       2016209056         12/2016
(Continued)

OTHER PUBLICATIONS

PCT International Application No. PCT/KR2018/009291, Written Opinion of the International Searching Authority dated Nov. 23, 2018, 20 pages.
(Continued)

*Primary Examiner* — Duc T Duong
(74) *Attorney, Agent, or Firm* — Lee, Hong, Degerman, Kang & Waimey PC

(57) ABSTRACT

An embodiment of the present invention is a PSCCH transmission method. The method for a vehicle to everything (V2X) terminal to receive physical sidelink control channel (PSCCH) scheduling information and transmit a physical sidelink control channel (PSCCH) in a wireless communication system includes: a step for receiving Downlink control information related to sidelink semi persistent scheduling (SL SPS); a step for transmitting a first PSCCH in response to an instruction for activating an SL SPS configuration of the downlink control information; and a step for
(Continued)

transmitting a second PSCCH among reserved resources after transmitting the PSCCH, wherein, when the downlink control information is related to the SL SPS for two or more component carriers (CCs), time resource units at which the first PSCCH is transmitted in each CC do not overlap with each other. The UE is capable of communicating with at least one of another UE, a UE related to an autonomous driving vehicle, the BS or a network.

15 Claims, 15 Drawing Sheets

(56) References Cited

U.S. PATENT DOCUMENTS

| | | | |
|---|---|---|---|
| 2019/0110308 A1* | 4/2019 | Yasukawa | H04W 72/0413 |
| 2019/0173612 A1* | 6/2019 | Kimura | H04W 56/001 |
| 2020/0163103 A1* | 5/2020 | Kuang | H04W 72/04 |
| 2020/0374859 A1* | 11/2020 | Han | H04W 72/042 |
| 2021/0014831 A1* | 1/2021 | Ryu | H04W 76/11 |
| 2021/0045100 A1* | 2/2021 | Park | H04L 1/1812 |
| 2021/0144736 A1* | 5/2021 | Li | H04W 72/1263 |

FOREIGN PATENT DOCUMENTS

| | | |
|---|---|---|
| WO | 2017057989 | 4/2017 |
| WO | 2017128274 | 8/2017 |

OTHER PUBLICATIONS

Huawei, et al., "Miscellaneous corrections to 36.213", 3GPP TSG RAN WG1 Meeting #89, R1-1707061, May 2017, 3 pages.
Intel, "Sidelink carrier aggregation for LTE V2V communication", 3GPP TSG RAN WG1 Meeting #89, R1-1707300, May 2017, 8 pages.
CATT, "Correction on abbreviation of Sidelink SPS RNTI in DCI Format 5A in 36.212", 3GPP TSG RAN WG1 Meeting #89, R1-1707424, May 2017, 2 pages.
Ericsson, "Radio resource pool sharing between mode 3 and mode 4 UEs", 3GPP TSG RAN WG1 Meeting #89, R1-1708942, May 2017, 4 pages.
European Patent Office Application Serial No. 18843562.2, Search Report dated Apr. 22, 2021, 12 pages.
"14 UE procedures related to Sidelink," Release 14, 3GPP TS 36.213 V14.3.0, Jun. 2017, 57 pages.
Intel Corporation., "Sidelink carrier aggregation for LTE V2V communication," R1-1707300, 3GPP TSG RAN WG1 Meeting #89, May 2017, 8 pages.
Japan Patent Office Application No. 2020-507611, Office Action dated Apr. 20, 2021, 3 pages.
Ericsson et al., "Offline discussion on carrier aggregation," R1-1709766, 3GPP TSG RAN WG1 Meeting #89, May 2017, 2 pages.
NTT Docomo, Inc., "On Carrier aggregation for sidelink V2x," R1-1708426, 3GPP TSG RAN WG1 Meeting #89, May 2017, 5 pages.

* cited by examiner (a)

(b)

(a)

(b)

(a)

(b)

METHOD AND DEVICE FOR V2X TERMINAL TO RECEIVE PSCCH SCHEDULING INFORMATION AND TRANSMIT PSCCH IN WIRELESS COMMUNICATION SYSTEM

CROSS-REFERENCE TO RELATED APPLICATIONS

This application is the National Stage filing under 35 U.S.C. 371 of International Application No. PCT/KR2018/009291, filed on Aug. 13, 2018, which claims the benefit of U.S. Provisional Application No. 62/543,968, filed on Aug. 11, 2017, and 62/544,098, filed on Aug. 11, 2017, the contents of which are all hereby incorporated by reference herein in their entirety.

TECHNICAL FIELD

The present disclosure relates to a wireless communication system, and more particularly, to a method for a vehicle-to-everything (V2X) terminal to receive a physical sidelink control channel (PSCCH) scheduling information related to multiple component carriers (CCs) and transmit a PSCCH and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide a method of indicating control information on multiple carriers.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of transmitting, by a vehicle-to-everything (V2X) user equipment (UE), a physical sidelink control channel (PSCCH) upon receipt of PSCCH scheduling information in a wireless communication system. The method may include: receiving downlink control information related to sidelink semi-persistent scheduling (SL SPS); transmitting a first PSCCH based on an instruction for activating an SL SPS configuration in the downlink control information; and transmitting a second PSCCH on a reserved resource after transmitting the PSCCH. When the downlink control information is related to SL SPS for two or more component carriers (CCs), time resource units of the individual CCs may not overlap with each other, wherein the first PSCCH is transmitted in the time resource unit.

In another aspect of the present disclosure, provided is a vehicle-to-everything (V2X) user equipment (UE) device for receiving physical sidelink control channel (PSCCH) scheduling information and transmitting a PSCCH. The V2X UE device may include a transmitter; a receiver; and a processor. The processor may be configured to receive downlink control information related to sidelink semi-persistent scheduling (SL SPS), transmit a first PSCCH based on an instruction for activating an SL SPS configuration in the downlink control information, and transmit a second PSCCH on a reserved resource after transmitting the PSCCH. When the downlink control information is related to SL SPS for two or more component carriers (CCs), time resource units of the individual CCs may not overlap with each other, wherein the first PSCCH is transmitted in the time resource unit.

When the downlink control information is related to the SL SPS for the two or more CCs, frequency resources indicated by a field indicating frequency resource allocation may be allocated by an allocation unit, which is N times greater than that when the downlink control information is related to SL SPS for one CC.

When the downlink control information is related to the SL SPS for the two or more CCs, the field indicating the frequency resource allocation may indicate frequency resource allocation on the two or more CCs.

When the downlink control information is related to the SL SPS for the two or more CCs, the downlink control information may include information indicating whether messages transmitted on the two or more CCs are identical.

When the messages transmitted on the two or more CCs are not identical, the messages transmitted on the two or more CCs may be a part of one message.

The field indicating the frequency resource allocation may be included in the downlink control information.

In each CC, the time resource unit for transmitting the first PSCCH may be separated by an offset.

The offset may be included in the downlink control information.

The offset may be preconfigured for the UE.

When the downlink control information is related to the SL SPS for the two or more CCs, SL SPS configuration indices included in the downlink control information may indicate SPS processes for the two or more CCs.

A carrier indicator field included in the downlink control information may indicate combinations of the two or more CCs.

The downlink control information related to the SPS may be downlink control information (DCI) format 5A.

The DCI format 5A may include SPS activation/release information.

Advantageous Effects

According to the present disclosure, control information on multiple carriers may be indicated without any impacts on the conventional UE operation.

It will be appreciated by persons skilled in the art that the effects that may be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE

Figure 1:
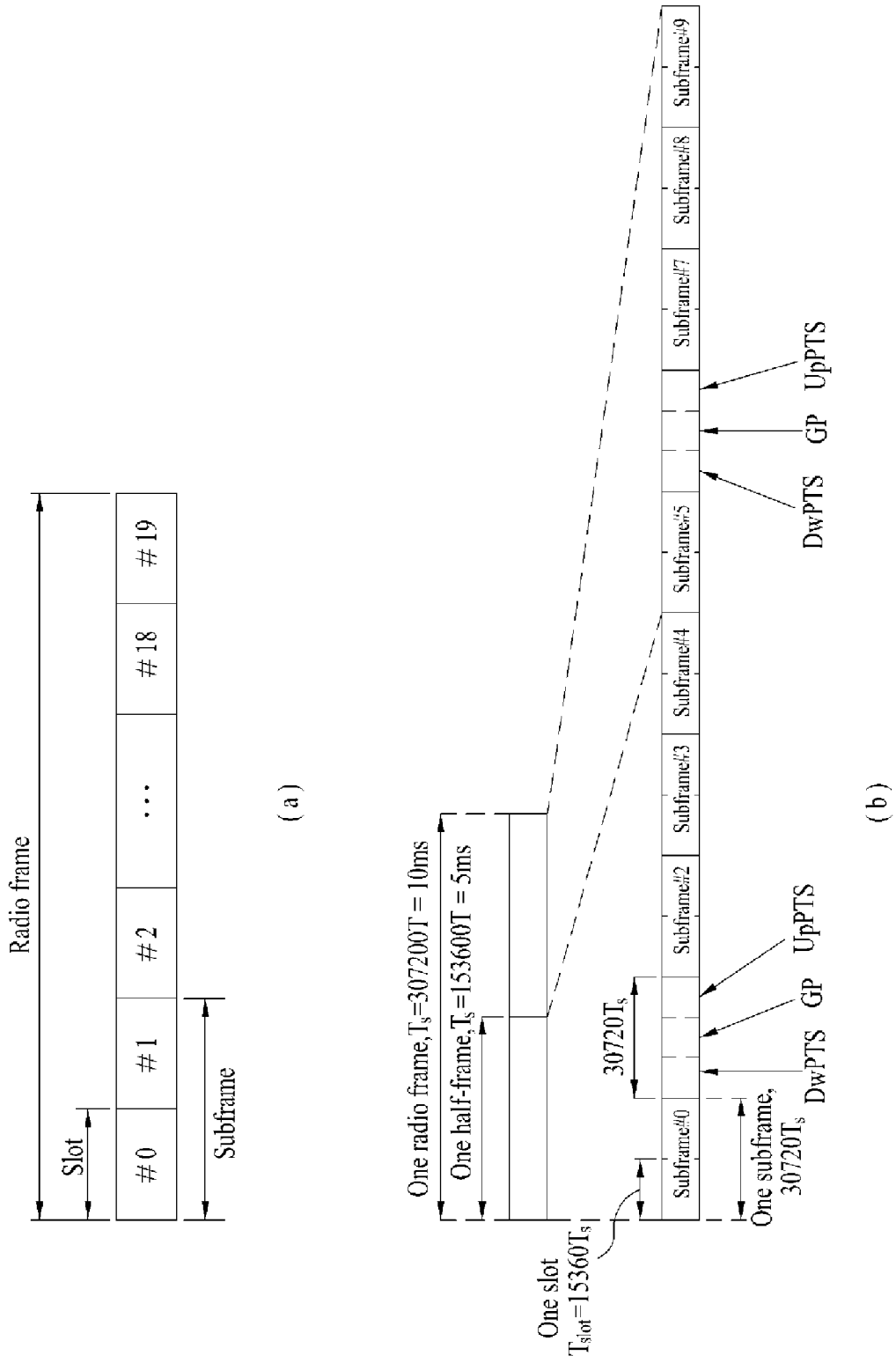
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
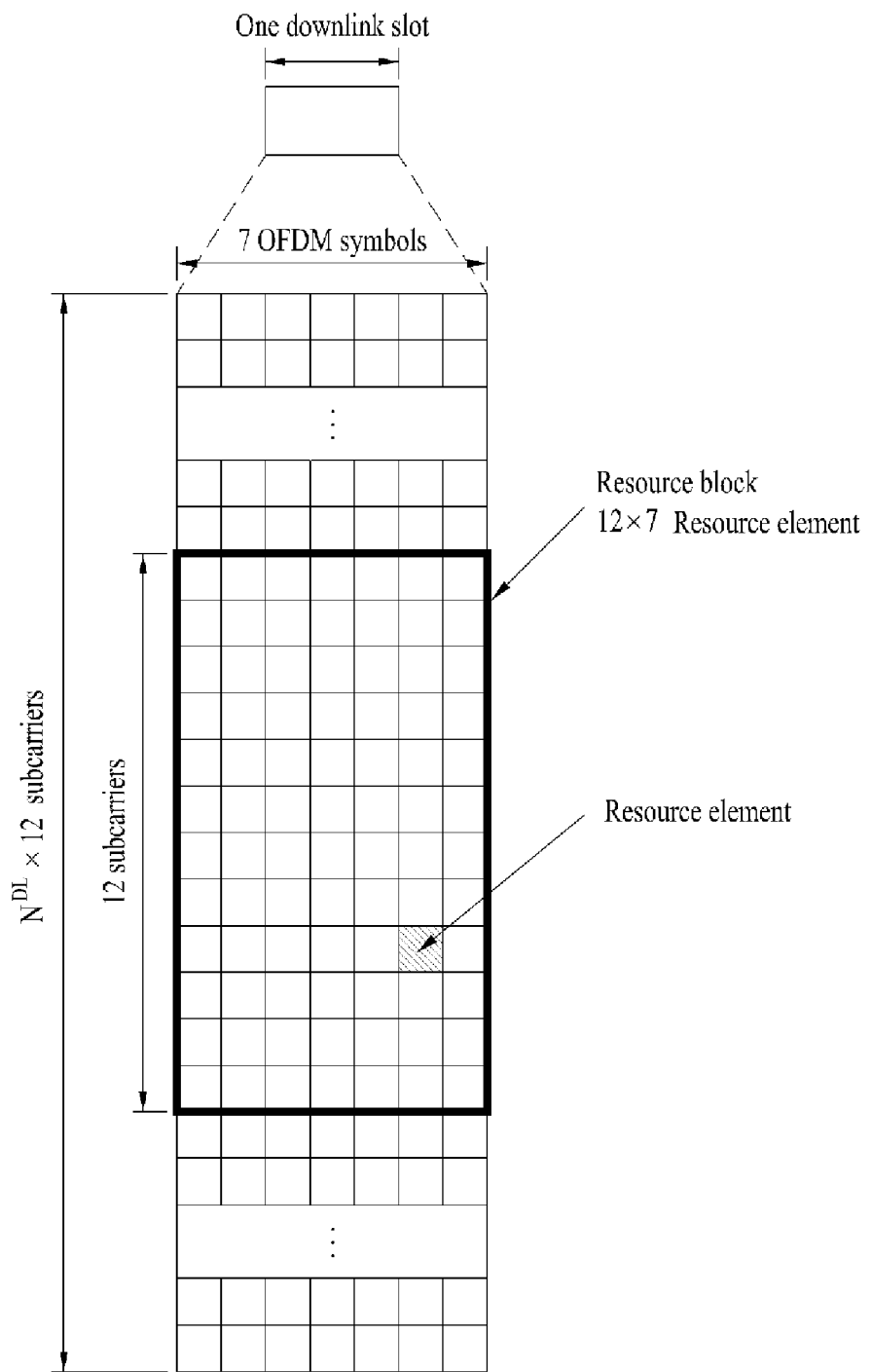
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
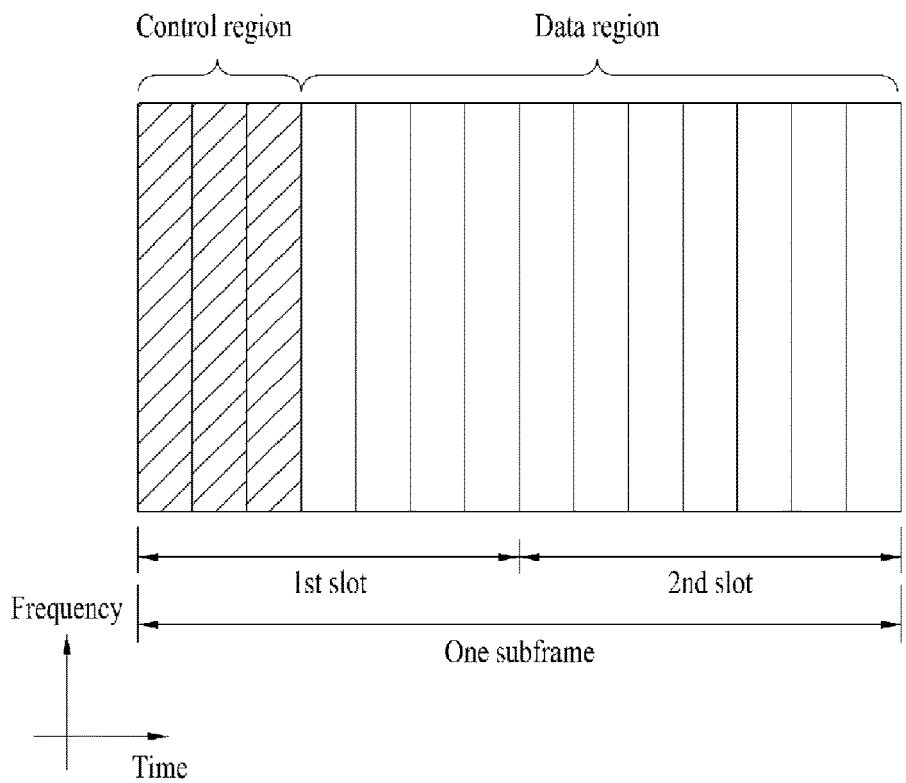
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
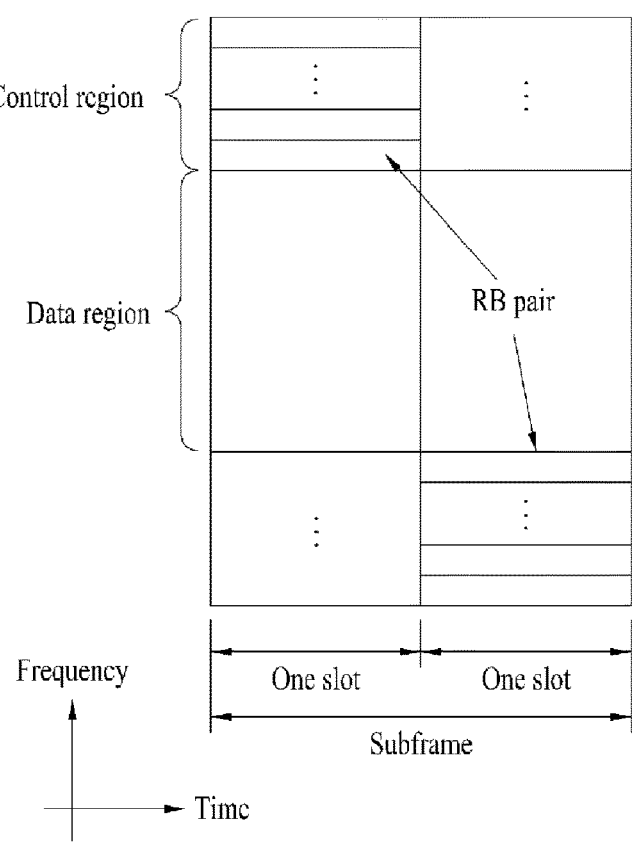
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
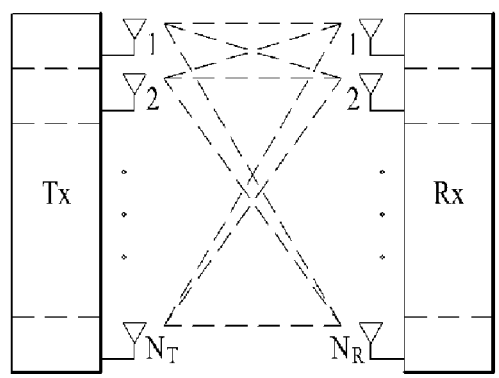
FIG. 5 is a view illustrating the configuration of a wireless communication system having multiple antennas.
Figure 5:
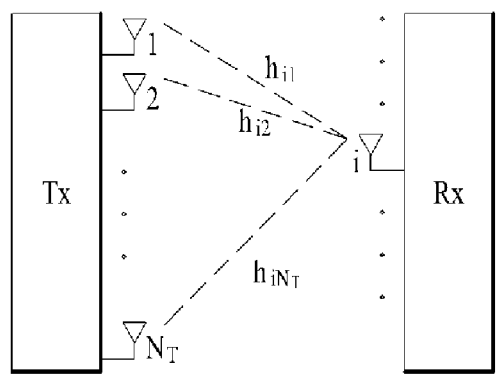

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$S = [s_1, s_2, \ldots, s_{N_T}]^T \quad \text{[Equation 2]}$$

Meanwhile, transmit powers can be set different from each other for individual pieces of transmission information respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition; $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1$, $x_2$, ..., $x_{N_T}$, which are actually transmitted, by applying weight matrix W to the information vector ŝ having the adjusted transmit powers, the weight matrix W serves to appropriately distribute the transmission information to each antenna according to a transport channel state. $x_1$, $x_2$, ..., $x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Example 5]}$$

$$W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1$, $y_2$, ..., $y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Example 8]}$$

An AWGN (Additive White Gaussian Noise) is added to the actual channels after a channel matrix H. The AWGN $n_1$, $n_2$, ..., $n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \quad \text{[Equation 10]}$$

$$\begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
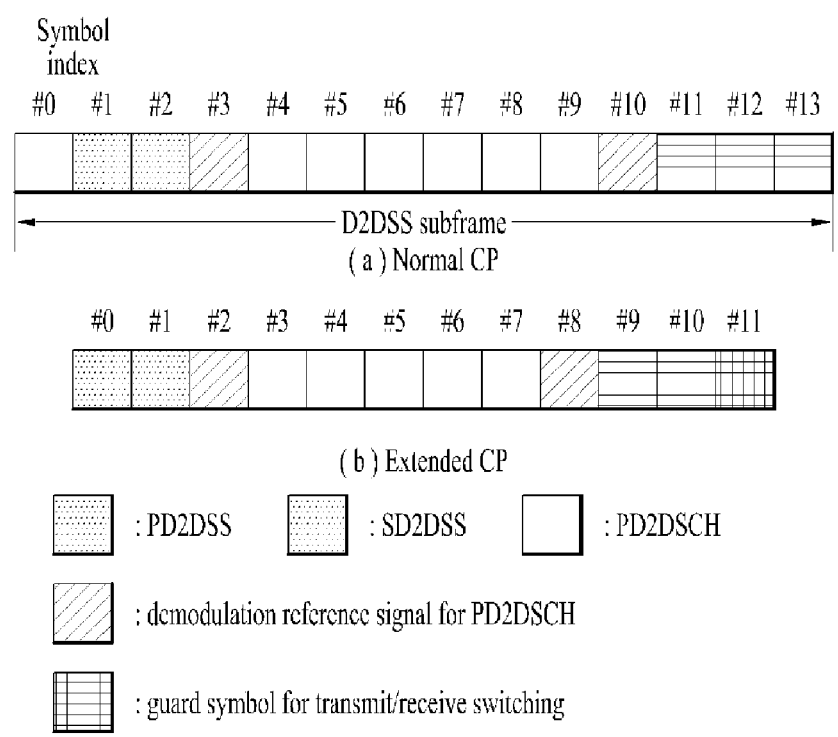
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
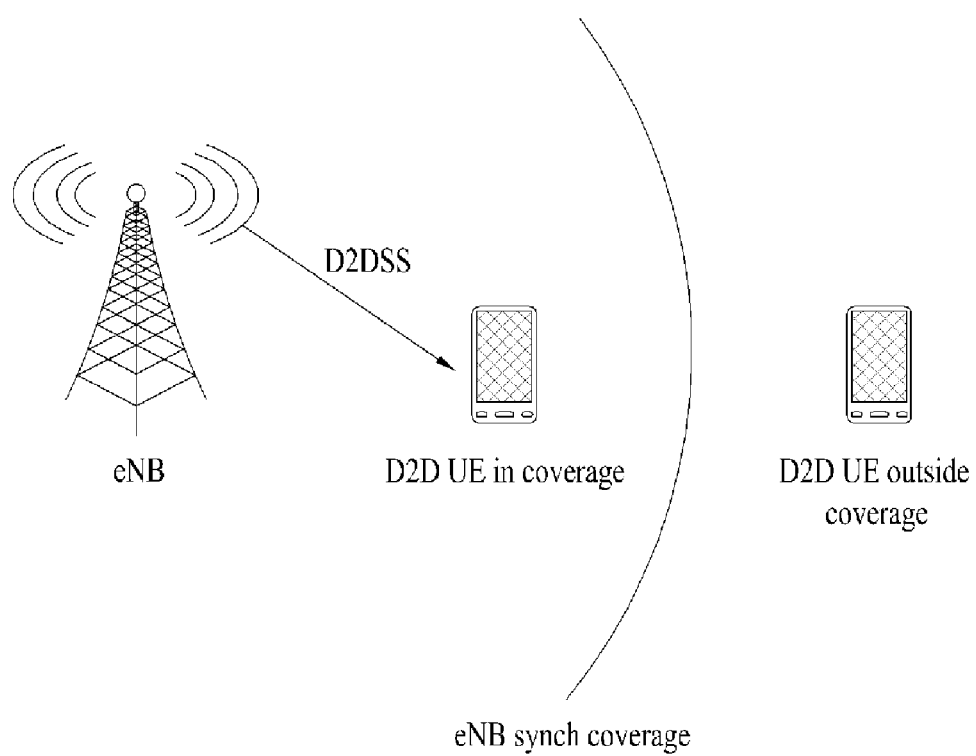
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
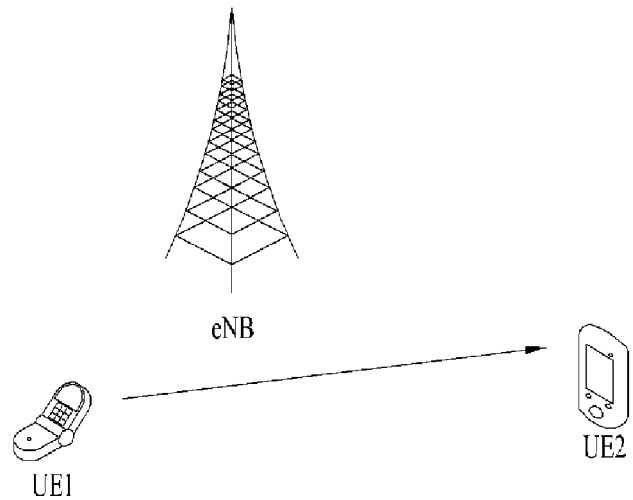
FIG. 8 is a view illustrating an exemplary D2D resource pool for D2D communication.
Figure 8:
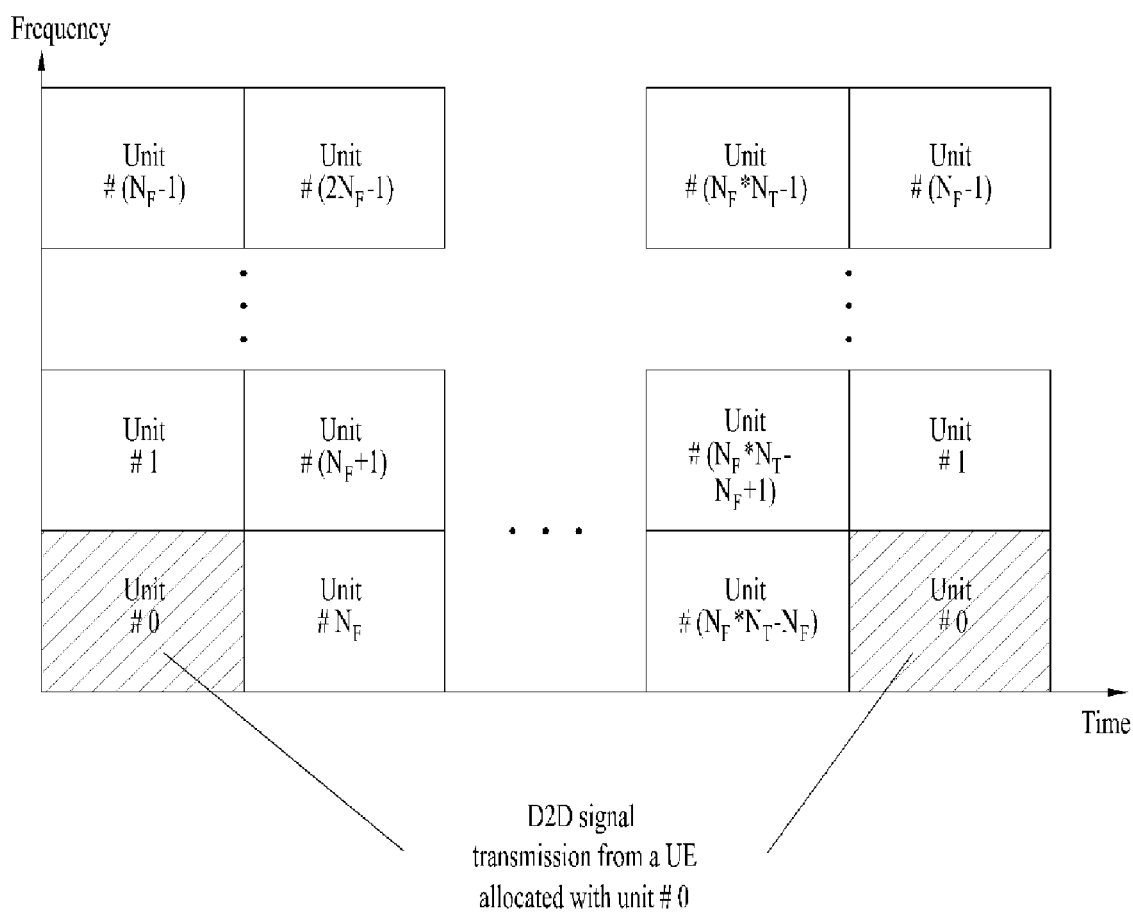

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F * N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
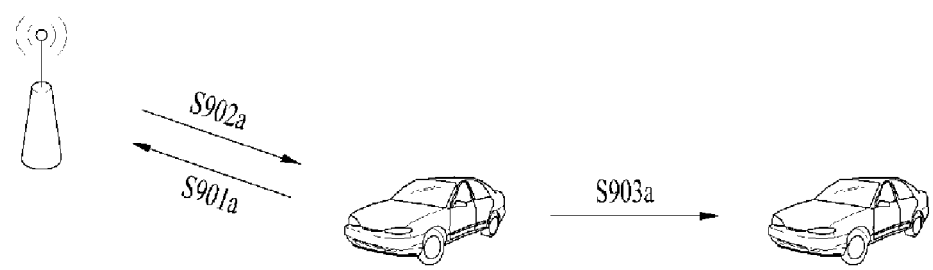
FIG. 9 is a view referred to for describing transmission modes and scheduling schemes for vehicle-to-everything (V2X)
Figure 9:
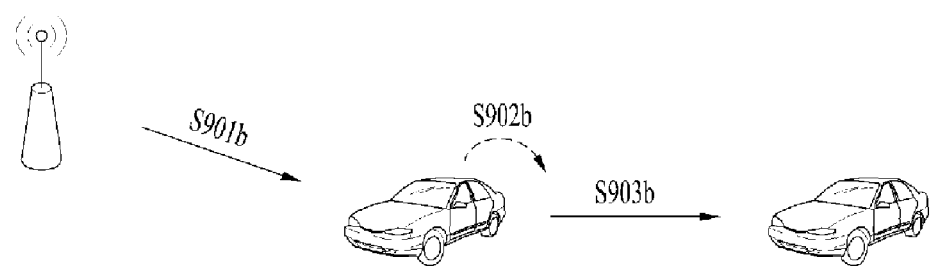
Figure 10:
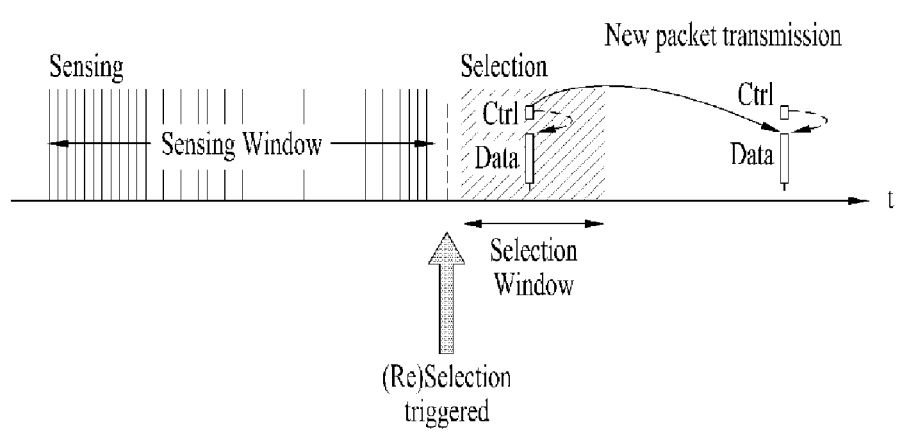
FIG. 10 is a view illustrating a method of selecting resources in V2X.
Figure 11:
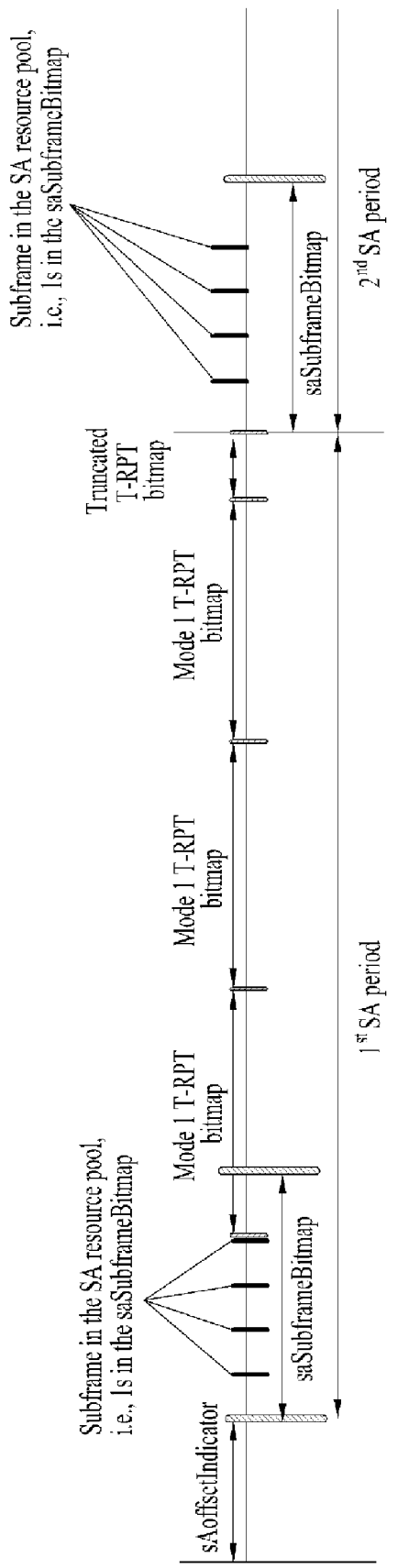
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to 1 s in a T-RPT bitmap, and one MAC PDU is transmitted four times.

Figure 12:
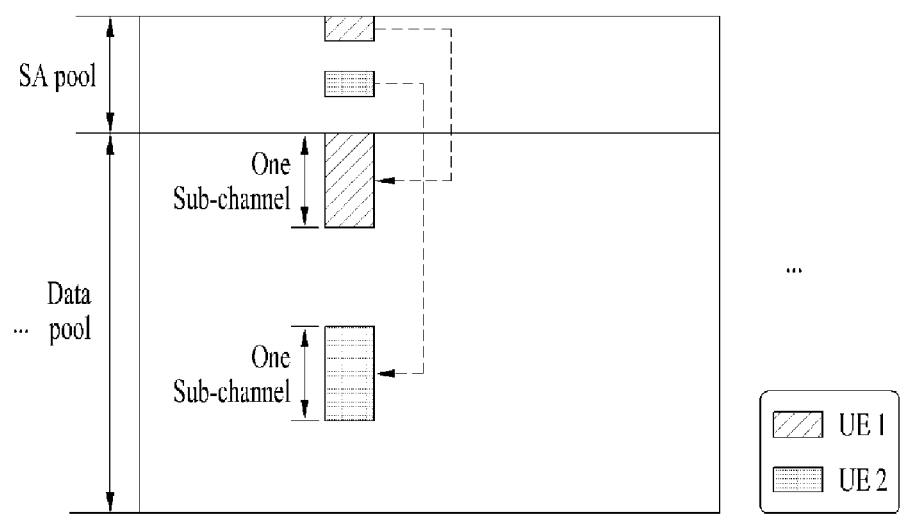
FIG. 12 is a view referred to for describing an SA and data transmission in V2X.
Figure 12:
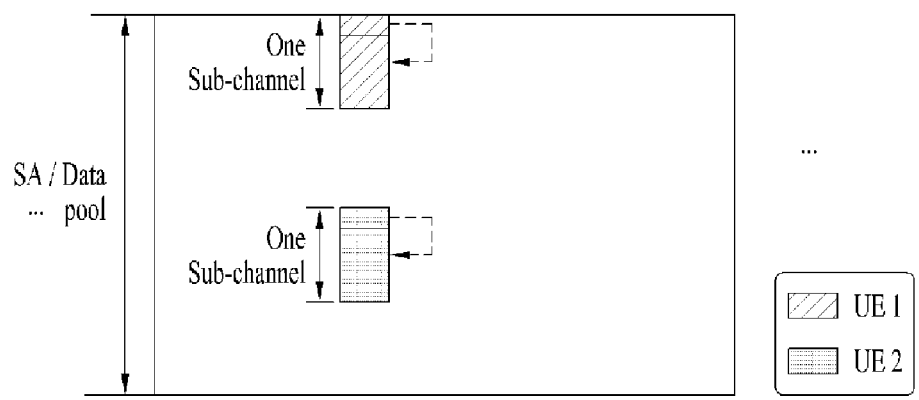

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
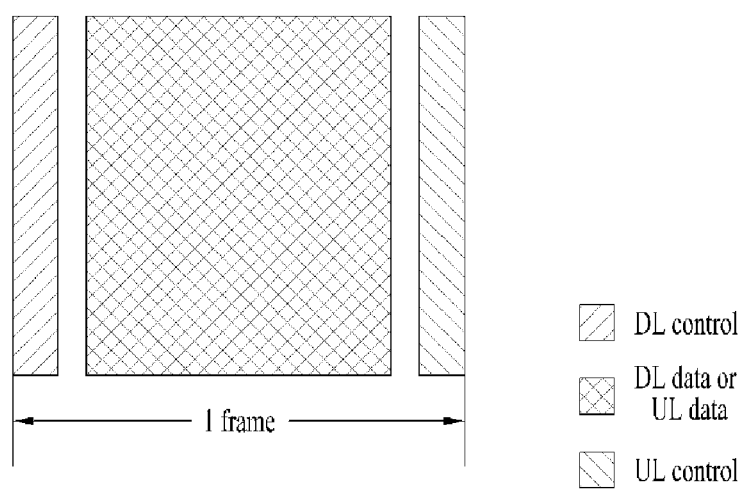
FIGS. 13 and 14 are views illustrating a new radio access technology (NRAT) frame structure.
Figure 14:
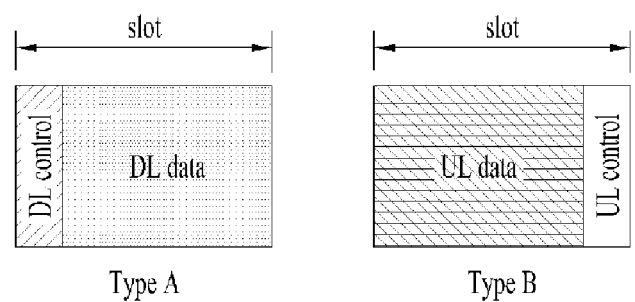
Figure 14:
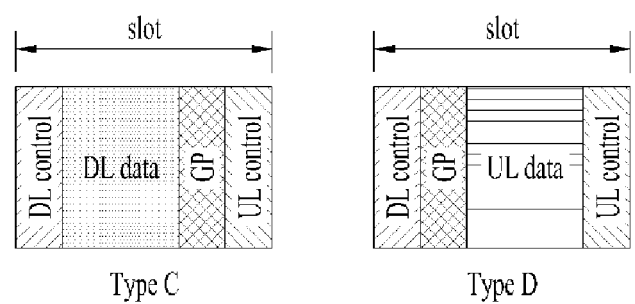

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Hereinafter, a method of indicating control information on multiple carriers without extending/changing a DCI format for sidelink scheduling or creating a new DCI format when carrier aggregation is applied to sidelink communication will be described. In other words, the present disclosure relates to a method of transmitting control information by using one piece of DCI and making the best use of an existing DCI format to minimize changes in the current specifications and prevent DCI overhead or DCI payload from increasing. However, the present disclosure is not limited to the existing DCI format. That is, the present disclosure is applicable when an existing DCI format is changed such that it covers some or all of the features described herein or when a new DCI format is created in the same manner.

Table 1 below is extracted from 3GPP TS 36.212 V15.1.0 and shows the definition of DCI format 5A scheduling a PSCCH. Herein, DCI format 5A may refer to PSCCH scheduling information.

start time. In each CC, the time resource unit for transmitting the first PSCCH may be separated from the other one by an offset. The offset may be included in the DCI, indicated through higher layer signaling (e.g., RRC), or preconfigured for the UE.

When the SPS configuration and release are simultaneously performed on the resources of the multiple carriers, all the multiple carriers controlled by the one piece of DCI may have the same transmission start time, and thus, transmission may be performed on all the multiple carriers at the same time. Accordingly, there may be a transmission power distribution problem, and the transmission power distribution problem needs to be solved.

Figure 15:
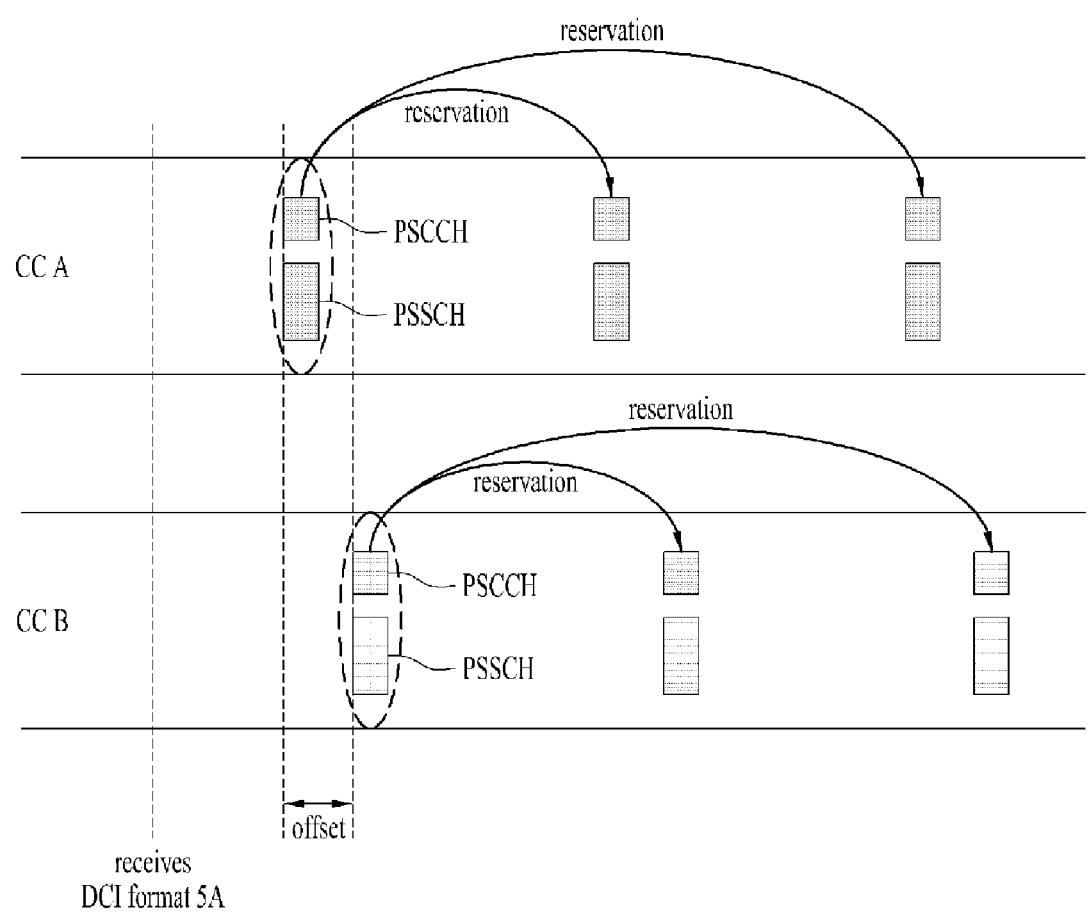
FIG. 15 illustrates an example of a PSCCH transmission method according to an embodiment of the present disclosure.

FIG. 15 illustrates an example of the above-described method. When the SL SPS is activated for CC A and CC B, CC A and CC B may be configured such that a time gap corresponding to an offset exists between the first PSCCH transmission on CC A and the first PSCCH transmission on CC B. The offset value related to the transmission start time on each carrier may be preconfigured or signaled to the UE through higher layer signaling or physical layer signaling. Although FIG. 15 shows that PSCCH transmission is frequency division multiplexed (FDMed) with PSSCH transmission, the present disclosure is not limited thereto. The activation of the SL SPS for multiple carriers may be indicated by one piece of DCI, and an offset value may be configured for an actual transmission timing on each carrier.

TABLE 1

DCI format 5A is used for the scheduling of PSCCH, and also contains several SCI format 1 fields used for the scheduling of PSSCH.
The following information is transmitted by means of the DCI format 5A:
   Carrier indicator –3 bits. This field is present according to the definitions in [3].
   Lowest index of the subchannel allocation to the initial transmission - $[\log_2(N_{subchannel}^{SL})]$ bits as defined in
      section 14.1.1.4C of [3].
   SCI format 1 fields according to 5.4.3.1.2:
      Frequency resource location of initial transmission and retransmission.
      Time gap between initial transmission and retransmission.
   SL index - 2 bits as defined in section 14.2.1 of [3] (this field is present only for cases with TDD operation with
      uplink-downlink configuration 0-6).
When the format 5A CRC is scrambled with SL-SPS-V-RNTI, the following fields are present:
   SL SPS configuration index - 3 bits as defined in section 14.2.1 of [3].
   Activation/release indication - 1 bit as defined in section 14.2.1 of [3].
If the number of information bits in format 5A mapped onto a given search space is less than the payload size of format
0 mapped onto the same search space, zeros shall be appended to format 5A until the payload size equals that of format
0 including any padding bits appended to format 0.
If the format 5A CRC is scrambled by SL-V-RNTI and if the number of information bits in format 5A mapped onto a
given search space is less than the payload size of format 5A with CRC scrambled by SL-SPS-V-RNTI mapped onto
the same search space and format 0 is not defined on the same search space, zeros shall be appended to format 5A until
the payload size equals that of format 5A with CRC scrambled by SL-SPS-V-RNTI.

Embodiments

According to an embodiment of the present disclosure, a UE may receive DCI (for PSCCH scheduling information) related to sidelink semi-persistent scheduling (SL SPS) and transmit a first PSCCH based on an instruction for activating an SLS SPS configuration in the DCI. That is, upon receipt of one piece of DCI, SL SPS configuration and release may be simultaneously performed on resources of multiple carriers. In addition, after transmitting the PSCCH, the UE may transmit a second PSCCH on a reserved resource.

When the DCI is related to SL SPS for two or more component carriers (CCs), time resource units of the individual CCs may not overlap with each other, wherein the first PSCCH is transmitted in the time resource unit. That is, although the SPS configuration and release are simultaneously performed on the resources of the multiple carriers, each transmission carrier may have a different transmission In this case, it may be considered that different offset values are configured for the PSCCH and PSSCH, and in this case, the PSCCH and PSSCH may be TDMed and transmitted.

When the DCI is related to SL SPS for the two or more CCs, frequency resources, which are indicated by a field indicating frequency resource allocation, may be allocated by an allocation unit which is N times greater than that when the DCI is related to SL SPS for one CC. The field indicating the frequency resource allocation may be included in the DCI. When the DCI is related to the SL SPS for the two or more CCs, the field indicating the frequency resource allocation may indicate frequency resource allocation on the two or more CCs. Details thereof will be described in the following.

When the DCI is related to the SL SPS for the two or more CCs, the frequency resources may be indicated by some of the bits allocated for the field indicating the frequency resource (allocation) (frequency resource location of the initial transmission and retransmission field), and resources on other carriers may be indicated by the remaining bits in the corresponding field. An eNB may allow the frequency resources to be configured on a basis of a greater one between an N multiple of a subchannel and a multiple of the subchannel, instead of using the conventional method where all resources are indicated on a subchannel basis. As a result, there may be residual bits among bits allocated for a DCI field, which indicates the frequency resources, and the corresponding bits may be used to indicate resources on other CCs. Specifically, in DCI format 5A, the location of frequency resources for initial transmission and retransmission is indicated by a resource allocation value (RIV), which is defined as follows.

$$RIV = N_{subCH}(L_{subCH}-1) + n_{subCH}^{start}$$

$$RIV = N_{subCH}(N_{subCH}-L_{subCH}+1) + (N_{subCH}-1-n_{subCH}^{start})$$  [Equation 12]

In the above Equation, $N_{subCH}$ denotes the total number of subchannels, $n_{subCH}^{start}$ denotes the index of a start subchannel among allocated subchannels, and $L_{subCH}$ denotes the length of consecutively allocated subchannels. The first RIV definition is for a case where $L_{subCH}$ is smaller than a half of the total number of subchannels, and the second RIV definition is for a case where $L_{subCH}$ is greater than the half of the total number of subchannels.

In this case, if the frequency resources are configured on the basis of the multiple of N (for example, a multiple of 2, a multiple of 4, etc.), the value of $L_{subCH}$ may decrease to 1/N. For instance, assuming that $L_{subC}=16$, $n_{subCH}^{start}=3$ and $N_{subCH}=20$, if $L_{subCH}$ is configured on one subchannel basis as in the prior art, the RIV is 116. However, if subchannels are allocated on a four-basis, that is, if $L_{subCH}$ is 4, the RIV is 63. In this case, there may be residual bits among RIV bits. The RIV of another CC may be indicated using the residual bits or using additional bits together with the residual bits.

When multiple carriers are controlled by one piece of DCI, CA transmission may be performed using transmission resources at the same position on every transmission carrier. Alternatively, the location of transmission resources on each carrier may be configured based on a predetermined/signaled rule (for example, a method of preconfiguring an offset regarding the location of transmission resources on each carrier may be considered).

The DCI may include information on whether messages transmitted on two or more CCs are the same or not (when the DCI is related to the SL SPS for the two or more CCs). That is, in consideration of SL CA transmission, an indicator indicating whether messages transmitted on multiple carriers are the same or not may be included in an SCI field.

According to the CA discussion results in LTE Release 15 V2X, the following two cases need to be considered: (1) a case in which individual messages transmitted on carriers (configured for CA) from a transmitting UE are fully (or partially) different messages; and (2) a case in which the messages are fully/partially same. For example, the transmission method in case (1) may be used when a large data packet is divided into multiple V2X messages and the divided V2X messages are transmitted on individual carriers based on CA transmission, and the transmission method in case (2) may be used when the same/similar messages are repeatedly transmitted on multiple carriers to improve the reliability and performance of the message transmission. Therefore, in the case of the SL CA transmission, the necessity for including the indicator indicating whether messages transmitted on multiple carriers are the same or not in control information may need to be considered.

The indicator may be included in the SCI field (for example, as an indication using reserved bits) or added as an additional field to the existing DCI format (DCI format 5A in Rel-14). Alternatively, a method of piggybacking the indicator on a data channel (e.g., PSSCH) may be considered.

Meanwhile, a receiving UE may determine, based on the indicator, whether the messages received on the multiple carriers are the same or not. If the messages are the same, (soft) combining may be performed by the physical layer at the receiving end to improve the reliability and performance of the reception. In this case, the redundancy version of channel coding may be the same or different per transmission carrier. When the message transmitted on the two or more CCs are different, the messages transmitted on the two or more CCs may be a part of one message. The receiving UE may combine the messages when performing decoding. That is, when the messages are different, the receiving UE may separately decode the messages received on the individual carriers and restore a large size of data through higher layer operation based on the indicator.

The DCI related to the SPS may have DCI format 5A, and DCI format 5A may include information on SPS activation/release.

In addition, a carrier indicator field included in the DCI may indicate two or more CC combinations. Unlike the conventional method where a carrier for single-carrier transmission is indicated by a carrier indicator, a field indicating a combination of the indices of multiple CCs used for the CA transmission may be defined. Specifically, the indices of the multiple CCs used for the CA transmission may be represented by CIF values based on a mapping rule (i.e., transmission carrier index combination-CIF), which is preconfigured or signaled by the network. For example, Table 2 below shows a mapping rule between CC index combinations and CIF values on the assumption of 2-CC CA transmission. In LTE Release 14, the number of transmission carrier index combinations represented by a 3-bit CIF is 8. The network may configure a mapping table by combining predetermined/preselected transmission carrier index combinations with CIF values according to a specific rule (e.g., long-term measurement) among all possible carrier combinations. However, the mapping table may vary depending on network implementation.

TABLE 2

| Transmission carrier index combination | CIF |
|---|---|
| (CC0, CC1) | 000 |
| (CC0, CC2) | 001 |
| ... | ... |
| (CC3, CC4) | 110 |

Table 3 shows an example for transmission carrier index combinations when three CCs are indicated by the carrier indicator field.

If CIF tables for multiple aggregated CCs (as shown in Tables 2 and 3) are predetermined between UEs or the tables are signaled from/to the eNB/UE, the eNB may include the number of aggregated CCs in the DCI field, and thus, the UE may find a transmission carrier index combination by mapping a CIF value indicated by the eNB to a CIF table corresponding to the number of aggregated CCs. For example, referring to Table 3, when the number of aggregated CCs is 3 and the CIF field indicates a value of '001', it may indicate a transmission combination index combination of (CC0, CC2).

TABLE 3

| Transmission carrier index combination | CIF |
|---|---|
| (CC0, CC1, CC2) | 000 |
| (CC0, CC2, CC3) | 001 |
| ... | ... |
| (CC3, CC4, CC5) | 110 |

When the DCI is related to the SL SPS for the two or more CCs, SL SPS configuration indices included in the DCI may indicate SPS processes for the two or more CCs. That is, unlike the conventional method where an SPS process for single-carrier transmission is indicated by an SL SPS configuration index, the transmitting UE may be configured to indicate an SPS process for each of the multiple transmission carriers used for the CA transmission. For example, Table 4 below shows a mapping rule between SL SPS configuration indices and SPS process indices for multiple transmission carriers on the assumption of the 2-CC CA transmission. In this case, the values of X and Y in carrier #X and carrier #Y indicate transmission carrier indices and may be provided by the carrier indicator field(s). The mapping scheme may vary depending on the network implementation, and the network may configure or signal the mapping scheme to the UE in advance. Table 5 shows an example of 3-CC CA transmission.

TABLE 4

| SL SPS config. index | 2-CC CA case |
|---|---|
| 000 | SPS process #0 for carrier#X |
| | SPS process #1 for carrier#Y |
| 001 | SPS process #0 for carrier#X |
| | SPS process #3 for carrier#Y |
| ... | ... |

TABLE 5

| SL SPS config. index | 2-CC CA case |
|---|---|
| 000 | SPS process #0 for carrier#X |
| | SPS process #1 for carrier#Y |
| | SPS process #2 for carrier#Z |
| 001 | SPS process #0 for carrier#X |
| | SPS process #2 for carrier#Y |
| | SPS process #3 for carrier#Z |
| ... | ... |

In the above tables, the numbers of CCs are different. In this case, the payload of the CIF and SPS configuration (config.) index fields may be fixed or configured differently. When the payload is fixed, bits as many as the required number of combinations are used, and the rest may be zero-padded. For example, when the payload is fixed to 5 bits, if only 8 combinations (three bits are required) needs to be represented in 2-CC CA, two bits may be zero-padded as 00.

Alternatively, if SL SPS configuration index tables for multiple aggregated CCs (as shown in Tables 4 and 5) are predetermined between UEs or the tables are signaled from/to the eNB/UE, the eNB may include the number of aggregated CCs in the DCI field, and thus, the UE may find a SL SPS configuration combination by mapping an SL SPS configuration index indicated by the eNB to an SL SPS configuration index table corresponding to the number of aggregated CCs. For example, referring to Table 5, when the number of aggregated CCs is 3 and the CIF field indicates a value of '001', it may indicate SPS process #0 for carrier #X, SPS process #2 for carrier #Y, and SPS process #3 for carrier #Z.

In LTE Release 14, the size of DCI format 5A is fitted to DCI format 0 in the same search space, and in this case, padding bits may be generated. The padding bits may be used for the above-described methods.

Specifically, when DCI format 5A is mapped onto the search space for DCI format 0, there may be residual bits since the number of information bits of DCI format 5A is smaller than that of DCI format 0, and the residual bits are zero-padded. Such zero padding bits may be used for the at least one piece of information described in the present disclosure. For example, some of the zero padding bits may be used to indicate whether messages transmitted on multiple carriers are the same or (partially) different. When the aforementioned methods are applied, the conventional DCI format size may not be changed. For example, according to the methods, even if DCI indicates SL SPS for two or more CCs, the number of bits may be maintained the same as that of DCI format 5A with no additional bits.

In the present specification, the method of simultaneously perform the SPS configuration/release on resources of multiple carriers using the carrier indicator and SL SPS configuration index fields among DCI fields has been described. However, the present disclosure is not limited thereto. That is, the proposed method may be similarly applied using a combination of two different fields in DCI, which are different from the above two fields.

The present disclosure is not limited to D2D communication. That is, the disclosure may be applied to UL or DL communication, and in this case, the proposed methods may be used by an eNB, a relay node, etc. Although the proposed methods may be implemented independently, some of the proposed methods may be combined (or merged) for implementation. Moreover, it may be regulated that information on whether the proposed methods are applied (or information on rules related to the proposed methods) should be transmitted from an eNB to a UE through a predefined signal (e.g., a physical layer signal, a higher layer signal, etc.). Since each of the examples of the proposed methods may be included as one method for implementing the present disclosure, it is apparent that each example may be regarded as a proposed method. In addition.

Apparatus Configurations According to Embodiment of the Present Disclosure

Figure 16:
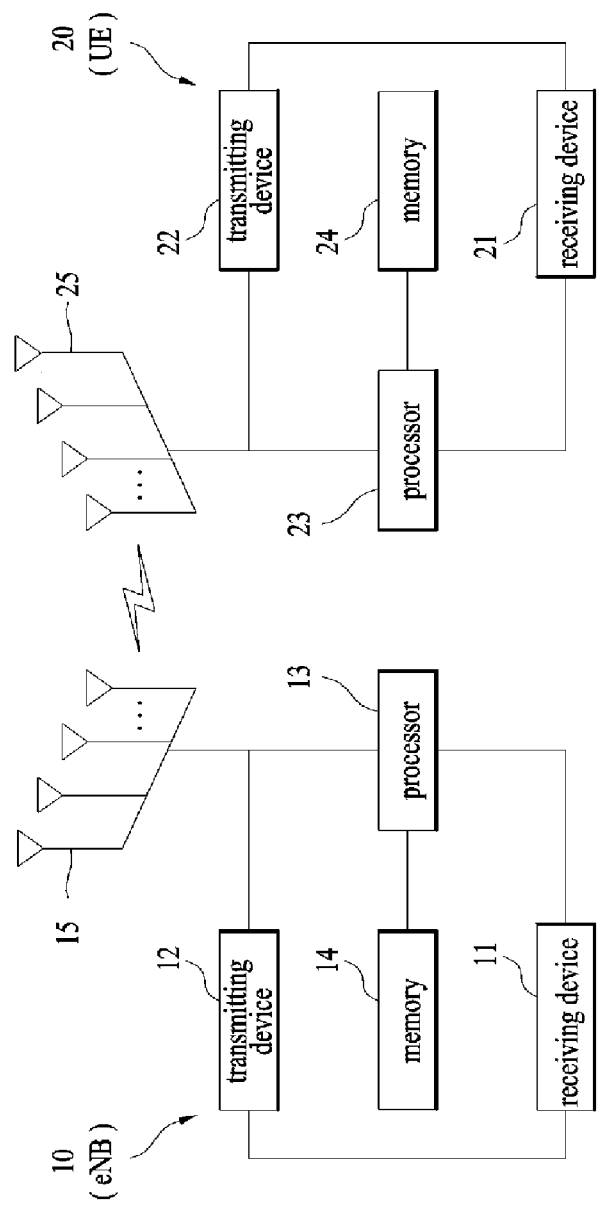
FIG. 16 is a diagram illustrating the configurations of transmitting and receiving devices.

FIG. 16 is a block diagram of a transmission point and a UE according to an embodiment of the present disclosure.

Referring to FIG. 16, a transmission point 10 according to the present disclosure may include a receiving device 11, a transmitting device 12, a processor 13, a memory 14, and a plurality of antennas 15. Use of the plurality of antennas 15 means that the transmission point 10 supports MIMO transmission and reception. The receiving device 11 may receive various UL signals, data, and information from a UE. The transmitting device 12 may transmit various DL signals, data, and information to a UE. The processor 13 may provide overall control to the transmission point 10. The processor 13 of the transmission point 10 according to an embodiment of the present disclosure may process requirements for each of the foregoing embodiments.

The processor 13 of the transmission point 10 may function to compute and process information received by the transmission point 10 and information to be transmitted to the outside. The memory 14 may store the computed and processed information for a predetermined time, and may be replaced by a component such as a buffer (not shown).

With continued reference to FIG. 16, a UE 20 according to the present disclosure may include a receiving device 21, a transmitting device 22, a processor 23, a memory 24, and a plurality of antennas 15. Use of the plurality of antennas 25 means that the UE 20 supports MIMO transmission and reception. The receiving device 21 may receive various DL signals, data, and information from an eNB. The transmitting device 22 may transmit various UL signals, data, and information to an eNB. The processor 23 may provide overall control to the UE 20.

The processor 23 of the UE 20 according to an embodiment of the present disclosure may be configured to perform the operations described in the above embodiments. Specifically, the processor 23 may be configured to receive DCI related to SL SPS, transmit a first PSCCH according to an instruction for activating an SLS SPS configuration in the DCI, and transmit a second PSCCH on a reserved resource after transmitting the PSCCH. When the DCI is related to SL SPS for two or more CCs, time resource units of the individual CCs may not overlap with each other, wherein the first PSCCH is transmitted in the time resource unit. In addition, the processor 23 of the UE 20 may be configured to perform functions of processing information received by the UE 20 or information to be transmitted by the UE device 20. The memory 24 may be configured to store the processed information for a predetermined time period, and it may be replaced with a component such as a buffer (not shown in the drawing).

The specific configuration of the transmission point and the UE may be implemented such that the details described in the various embodiments of the present disclosure may be applied independently or implemented such that two or more of the embodiments are applied at the same time. For clarity, a redundant description is omitted.

In the example of FIG. 16, the description of the transmission point 10 may also be applied to a relay as a DL transmission entity or a UL reception entity, and the description of the UE 20 may also be applied to a relay as a DL reception entity or a UL transmission entity.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting, by a vehicle-to-everything (V2X) user equipment (UE), a physical sidelink control channel (PSCCH) upon receipt of PSCCH scheduling information in a wireless communication system, the method comprising:
   receiving downlink control information related to sidelink semi-persistent scheduling (SL SPS);
   transmitting a first PSCCH based on an instruction for activating an SL SPS configuration in the downlink control information; and
   transmitting a second PSCCH on a reserved resource after transmitting the first PSCCH,
   wherein based on that the downlink control information is related to SL SPS for two or more component carriers (CCs), time resource units of the individual CCs do not overlap with each other, and
   wherein the first PSCCH is transmitted in the time resource unit.

2. The method of claim 1, wherein based on that the downlink control information is related to the SL SPS for the two or more CCs, frequency resources indicated by information about frequency resource allocation are allocated by an allocation unit N times greater than an allocation unit given based on that the downlink control information is related to SL SPS for one CC.

3. The method of claim 1, wherein based on that the downlink control information is related to the SL SPS for the two or more CCs, information about frequency resource allocation provides information about frequency resource allocation on the two or more CCs.

4. The method of claim 1, wherein based on that the downlink control information is related to the SL SPS for the two or more CCs, the downlink control information includes information on whether messages transmitted on the two or more CCs are identical.

5. The method of claim 4, wherein based on the messages transmitted on the two or more CCs are not identical, the messages transmitted on the two or more CCs are a part of one message.

6. The method of claim 1, wherein information about frequency resource allocation is included in the downlink control information.

7. The method of claim 1, wherein in each CC, the time resource unit for transmitting the first PSCCH is separated by an offset.

8. The method of claim 1, wherein an offset is included in the downlink control information.

9. The method of claim 1, wherein an offset is preconfigured for the V2X UE.

10. The method of claim 1, wherein based on that the downlink control information is related to the SL SPS for the two or more CCs, SL SPS configuration indices included in the downlink control information provide information on SPS processes for the two or more CCs.

11. The method of claim 1, wherein a carrier indicator field included in the downlink control information provides information on combinations of the two or more CCs.

12. The method of claim 1, wherein the downlink control information related to the SPS is downlink control information (DCI) format 5A.

13. The method of claim 1, wherein downlink control information (DCI) format 5A includes SPS activation/release information.

14. A vehicle-to-everything (V2X) user equipment (UE) device for receiving physical sidelink control channel (PSCCH) scheduling information and transmitting a PSCCH, the V2X UE device comprising:
a transmitter;
a receiver; and
a processor,
wherein the processor is configured to receive downlink control information related to sidelink semi-persistent scheduling (SL SPS), transmit a first PSCCH based on an instruction for activating an SL SPS configuration in the downlink control information, and transmit a second PSCCH on a reserved resource after transmitting the first PSCCH,
wherein based on that the downlink control information is related to SL SPS for two or more component carriers (CCs), time resource units of the individual CCs do not overlap with each other, and
wherein the first PSCCH is transmitted in the time resource unit.

15. The UE of claim 14, wherein the UE is capable of communicating with at least one of another UE, a UE related to an autonomous driving vehicle, the BS or a network.

* * * * *